United States Patent
Araki et al.

(10) Patent No.: US 7,875,352 B2
(45) Date of Patent: Jan. 25, 2011

(54) STABILIZED INORGANIC NANOPARTICLE, STABILIZED INORGANIC NANOPARTICLE MATERIAL, METHOD FOR PRODUCING STABILIZED INORGANIC NANOPARTICLE, AND METHOD FOR USING STABILIZED INORGANIC NANOPARTICLE

(75) Inventors: Koiti Araki, Sao Paulo (BR); Takuji Ogawa, Okazaki (JP); Eisuke Mizuguchi, Okazaki (JP)

(73) Assignee: Japan Science and Technology Agency, Saitama (JP)

( * ) Notice: Subject to any disclaimer, the term of this patent is extended or adjusted under 35 U.S.C. 154(b) by 539 days.

(21) Appl. No.: 11/792,326

(22) PCT Filed: Nov. 21, 2005

(86) PCT No.: PCT/JP2005/022028
§ 371 (c)(1),
(2), (4) Date: Sep. 5, 2007

(87) PCT Pub. No.: WO2006/059664
PCT Pub. Date: Jun. 8, 2006

(65) Prior Publication Data
US 2008/0268249 A1    Oct. 30, 2008

(30) Foreign Application Priority Data
Dec. 3, 2004   (JP) .............................. 2004-351330

(51) Int. Cl.
B32B 5/16      (2006.01)
B05D 7/00      (2006.01)
(52) U.S. Cl. ...................... 428/403; 427/212; 427/215; 427/220
(58) Field of Classification Search ......... 428/403–407; 427/212, 215, 220
See application file for complete search history.

(56) References Cited

U.S. PATENT DOCUMENTS 5,294,369 A    3/1994   Shigekawa et al.

(Continued)

FOREIGN PATENT DOCUMENTS

JP    6-116602    4/1994

(Continued)

OTHER PUBLICATIONS

"Synthesis of thiol-derivated gold nanoparticles in a two-phase liquid-liquid system", Mathias Brust et al.; J. Chem. Soc., Chem. Communi., 1994, No. 7, pp. 801-802.

(Continued)

Primary Examiner—H. (Holly) T Le
(74) Attorney, Agent, or Firm—Jordan and Hamburg LLP

(57) ABSTRACT

A stabilized inorganic nanoparticle which is stabilized by bonding protective ligands to a surface of an inorganic nanoparticle, wherein one part of binding sites on the surface of the inorganic nanoparticle are bonded to the protective ligand, the other part of the binding sites remain as a free site not bonded to the protective ligand, and satisfies the condition that the amount of the protective ligand bonded to the inorganic nanoparticle is a critical amount or the condition that the form of modifying the surface of the inorganic nanoparticle by the protective ligand is a critical modification form.

According to the present invention, there is provided a stabilized inorganic nanoparticle that is stabilized by a protective ligand and can be rapidly functionalized with ease by bonding a functional ligand thereto.

12 Claims, 8 Drawing Sheets

U.S. PATENT DOCUMENTS

| | | | |
|---|---|---|---|
| 5,384,073 A | | 1/1995 | Shigekawa et al. |
| 6,369,209 B1 | * | 4/2002 | Manoharan et al. ......... 536/23.1 |
| 6,664,315 B2 | * | 12/2003 | Tomalia et al. ............... 523/218 |
| 6,730,537 B2 | * | 5/2004 | Hutchison et al. ............. 438/99 |
| 7,404,928 B2 | * | 7/2008 | Foos et al. ............... 422/82.02 |
| 7,413,770 B2 | * | 8/2008 | Huang et al. ................ 427/216 |

FOREIGN PATENT DOCUMENTS

| | | | |
|---|---|---|---|
| JP | 10-195505 | | 7/1998 |
| JP | 2000-504374 | | 4/2000 |
| WO | WO2004/012855 | * | 2/2004 |
| WO | WO-2004/012855 | | 2/2004 |

OTHER PUBLICATIONS

"Synthesis of reactions of functionalized gold nanoparticles", M. Brust et al.; J. Chem. Soc., Chem. Commun., 1995, No. 16, pp. 1655-1656.

"Heat-induced size evolution of gold nanoparticles in the solid state", T. Teranishi et al.; Advanced Materials, 2001, vol. 13, No. 22, pp. 1699-1701 + 1657.

"Size Evolution of Alkanethiol-Protected Gold Nanoparticles by Heat Treatment in the Solid State", Takami Shimizu; The Journal of Physical Chemistry B., v. 107, No. 12, Mar. 27, 2003, pp. 2719-2724.

"Modulation of the Photophysical Properties of Gold Nanoparticles by Accurate Control of the Surface Coverage", Marco Montalti et al.; Langmuir, 2004, vol. 20, No. 18, pp. 7884-7886.

* cited by examiner (a)

(b)

STABILIZED INORGANIC NANOPARTICLE, STABILIZED INORGANIC NANOPARTICLE MATERIAL, METHOD FOR PRODUCING STABILIZED INORGANIC NANOPARTICLE, AND METHOD FOR USING STABILIZED INORGANIC NANOPARTICLE

BACKGROUND OF THE INVENTION

1. Technical Field

The present invention relates to a stabilized inorganic nanoparticle, a stabilized inorganic nanoparticle material, a method for producing a stabilized inorganic nanoparticle, and a method for using a stabilized inorganic nanoparticle.

The invention relates particularly to a stabilized inorganic nanoparticle obtained by bonding protective ligands to a surface of a nanoscale fine inorganic particle composed of a metal, a metal oxide, a semiconductor substance, etc. to stabilize the inorganic particle, which can be easily and rapidly functionalized by bonding functional ligands to the inorganic particle because the stabilized inorganic nanoparticle has a sufficient number of free binding sites on the surface and the protective ligands bonded is preferably high in substitution reactivity.

The invention further relates to a novel method for producing such a stabilized inorganic nanoparticle, and a method for using the stabilized inorganic nanoparticle for various purposes by bonding various functional ligand to characterize or functionalize the stabilized inorganic nanoparticle.

2. Background Art

[Metal Nanoparticle]

Inorganic nanoparticles, such as metal nanoparticles produced by forming metals such as gold into ultrafine particles, have unique chemical, electrical, and optical effects and catalytic activities, which cannot be found in bulk metals. Thus, researches have been made on the use of the inorganic nanoparticles in very many technological fields of photoelectrochemical devices, drug delivery systems, sensors, and the like and various developments on its application have been being contemplated.

However, the ultrafine metal nanoparticles are unstable without modifications, and are easily aggregated to form relatively large-diameter particles, which are not nanoparticles. This is an important disadvantage of the metal nanoparticles in practical use. Thus, the metal nanoparticle are, for example, poor in storage stability, and have to be used immediately after their preparation. Further, after the preparation of the metal nanoparticles, it is difficult or impossible to characterize them before using.

[Stabilization of Metal Nanoparticle]

In the ultrafine metal nanoparticles, a large number of metal atoms forming the particle are disposed on the particle surface, and can form bonds with various functional groups such as thiol, disulfide, phosphine, and amine groups. Thus, methods of producing a stabilized metal nanoparticle having a good stability (storage stability), which contains using the metal atom on the metal nanoparticle surface as a binding site, and bonding a protective ligand for stabilizing to the binding site, thereby modifying the metal nanoparticle, have been proposed.

[Reference 1] Mathias Brust, Merryl Walker, Donald Bethell, David J. Schiffrin, and Robin Whyman, "*Synthesis of Thiol-derivatised Gold Nanoparticles in a Two-phase Liquid-Liquid System*", *Journal of Chemical Society-Chemical Communications*, 801-802 (1994)

[Reference 2] M. Brust, J. Fink, D. Bethell, D. J. Schiffrin, and C. Kiely, "*Synthesis and Reactions of functionalized Gold Nanoparticles*", *Journal of Chemical Society-Chemical Communications*, 1655-1656 (1995)

For example, Brust et al. have proposed a method of preparing gold nanoparticles and stabilizing the gold nanoparticles by using a protective ligand (a thiol compound) in References 1 and 2. The essential point of the method is such that $AuCl_4^-$ is reduced under presence of an aqueous $NaBH_4$ solution in a toluene solution to generate gold nanoparticles, and the toluene solution contains protective ligands such as n-dodecanethiol for stabilizing the metal clusters and a phase transfer agent of tetraoctylammonium.

Further, it has been reported that the gold nanoparticles prepared by this method have a narrow particle diameter distribution range. It is known that the particle sizes of the metal nanoparticles greatly affect various properties thereof, and thus the narrow particle diameter distribution range is regarded as preferable.

Teranishi et al. have reported in the following References 3 and 4 that gold nanoparticles having a remarkably narrow particle diameter distribution, protected by thiol compounds, can be obtained by treating a solid sample prepared beforehand at a controlled temperature.

[Reference 3] T. Teranishi, S. Hasegawa, T. Shimizu, and M. Miyake, "*Heat-Induced Size Evolution of Gold Nanoparticles in the Solid State*", *Adv. Mater.*, 13, 1699-1701 (2001)

[Reference 4] T. Shimizu, T. Teranishi, S. Hasegawa, and M. Miyake, "*Size Evolution of Alkanethiol-protected Gold Nanoparticles by Heat Treatment in the Solid State*", *Journal of Physical Chemistry B*, 107, 2719-2724 (2003)

Various functional groups can be bonded to the metal nanoparticle surfaces as described above, and the greatest benefit thereof is not that the protective ligands for stabilizing the nanoparticles can be bonded to the surfaces, but that the metal nanoparticles are functionalized, namely various molecules with various characteristics and functions (functional ligands) can be bonded to the surfaces to functionalize the metal nanoparticle. By the functionalization, the resultant metal nanoparticles can show the physicochemical properties of the functional ligands or additional properties, whereby it becomes possible to use the metal nanoparticles for further greater range of applications.

In the report by Brust, et al., in addition to the stabilization of the gold nanoparticles, functionalization thereof by replacing the protective ligand with a functional ligand is described. However, in the case of the stabilized gold nanoparticles according to the report by Brust, et al., it generally takes 2 days or more to sufficiently replace the protective ligands of dodecanethiol by the functional ligands, and the functionalization cannot be expected to be practically used due to the inefficiency.

It has been proposed that protective ligands poor in bonding strength, such as triphenylphosphine, amine, and tert-dodecanethiol, are used instead of dodecanethiol to accelerate the substitution with the functional ligands. However, as a result of experiments by the inventors, the substitution is not accelerated very much by using such protective ligands. Thus, it seems difficult to solve the problem by using such protective ligands instead.

[Reference 5] M. Montalti, L. Prodi, N. Zaccheroni, and G. Battistini, "*Modulation of the Photophysical Properties of GoldNanoparticlesbyAccurate Control of the Surface Coverage*", *Langmuir*, 2004, 20, 7884-7886

In above Reference 5, a study on controlling coverage of gold nanoparticles with a fluorescent molecular is disclosed.

However, the study is made in view of fluorescence switching, and the bonding of the fluorescent molecular to the gold nanoparticles is not for purpose of stabilizing and functionalizing the gold nanoparticles. Further, the density of the fluorescent molecules on the gold nanoparticle surfaces is controlled only by selecting the amount of the fluorescent molecular added to the reaction system, and as shown in FIG. 1 of Reference 5, a distinguishing relation is not observed between the surface density of the fluorescent molecular and stabilization/functionalization of the gold nanoparticles.

Though the above problems are described with respect to metal nanoparticles, inorganic nanoparticles composed of inorganic materials other than metals, such as metal oxides and semiconductor materials, have the same problems.

SUMMARY OF THE INVENTION

Accordingly, an object of the present invention is to provide a stabilized inorganic nanoparticle, which is sufficiently stabilized by protective ligands bonded to a surface thereof and can be rapidly bonded to functional ligands, a method for producing the stabilized inorganic nanoparticle, and a method for using the same.

The inventors has tested and researched processes of bond formation between protective ligands and inorganic nanoparticles, and mechanisms of stabilization of inorganic nanoparticles by protective ligands. As a result, the inventors has found that there is a particular critical region in a process of increasing the amount of a protective ligand bonded to an inorganic nanoparticle or a process of modifying the inorganic nanoparticle by the protective ligands, in which the inorganic nanoparticle is sufficiently stabilized and functional ligands can be sufficiently bonded thereto rapidly. The present invention has been completed based on the finding.

According to a first aspect of the invention, there is provided a stabilized inorganic nanoparticle obtained by bonding protective ligands to a surface of an inorganic nanoparticle to stabilize the inorganic nanoparticle, wherein one part of binding sites on the surface of the inorganic nanoparticle are bonded to the protective ligand, the other part of the binding sites remain as a free site not bonded to the protective ligand, and the stabilized inorganic nanoparticle satisfies the condition that the amount of the protective ligand bonded to the inorganic nanoparticle is a critical amount or the condition that the form of modifying the surface of the inorganic nanoparticle by the protective ligand is a critical modification form, wherein the critical amount is defined as (1) an amount between a lower limit required for stabilizing the inorganic nanoparticle and an upper limit at or below which a functional ligand is substantially not inhibited from bonding to the inorganic nanoparticle by the protective ligand, (2) an amount required for bonding the protective ligand to 8% to 30% of the binding sites on the surface of the inorganic nanoparticle while maintaining the stability and high reactivity of the inorganic nanoparticle, or (3) in a case where a reaction for bonding the protective ligand to the inorganic nanoparticle proceeds slowly in an induction period and then proceeds rapidly in a bond forming period, an amount of the protective ligand bonded at a time when the reaction is stopped before the completion of the induction period, and the critical modification form is defined as (4) a form with a spatial arrangement in which the molecular skeleton of the protective ligand is arranged in the tangential direction of the surface of the inorganic nanoparticle, and the free site on the surface of the inorganic nanoparticle is covered with the molecular skeleton.

In the first aspect of the invention, the term "a functional ligand is substantially not inhibited" means that the functional ligand is not inhibited to the extent that the functional ligand cannot sufficiently show an additional property or characteristic on the inorganic nanoparticle. The extent depends on the type of the functionalization by the functional ligand, the desired function of the functionalized inorganic nanoparticle, etc., and thus it is difficult to uniformly define the extent specifically.

In a case where an optional modification ligand is bonded to 8% to 30% of the binding sites of the inorganic nanoparticle by an optional method or means without restrictions, the resultant inorganic nanoparticle does not necessarily have the stability and high reactivity as hereinafter described in Examples. Thus, in this case, when the resultant inorganic nanoparticle does not have the stability and high reactivity, the amount of the ligand does not meet the definition of (2) with the term "while maintaining the stability and high reactivity of the inorganic nanoparticle".

The stabilized inorganic nanoparticle according to the first aspect of the invention is sufficiently stabilized, and a functional ligand can be rapidly and sufficiently bonded thereto to variously characterize or functionalize the nanoparticle. Thus, the stabilized inorganic nanoparticle can be preferably used as temporally storable inorganic nanoparticle that is put in practical use or characterization without modification, or as a material for obtaining a functional inorganic nanoparticle by bonding a functional ligand.

The inventors has made experiments and examinations on the reaction of forming the inorganic nanoparticle and the reaction of bonding the protective ligand to the inorganic nanoparticle, and has obtained the following, two important knowledges by observing temporal changes of absorption spectra of reaction liquids at a particular wavelength.

The first knowledge is that the reaction for bonding the protective ligand to the inorganic nanoparticle proceeds remarkably slowly in an initial induction period, and then proceeds rapidly in a bond forming period, in which the protective ligand is rapidly bonded to most or all of the binding sites on the inorganic nanoparticle. This knowledge is not disclosed or suggested at all in various known literatures including the above report of Brust, et al.

The second knowledge is that, in the case of stopping the reaction for bonding the functional ligand in the induction period, some of the surface binding sites are bonded to the protective ligand, most of the other binding sites remain as a free site (a free binding site not bonded to the protective ligand), and the resultant inorganic nanoparticle is sufficiently stabilized and has a high reactivity for bonding a functional ligand.

The inventors has considered that the stability and high reactivity is obtained because of the particular modification form of the inorganic nanoparticle by the protective ligand.

In a stabilized inorganic nanoparticle provided by Brust, et al., a protective ligand is bonded to most or all of binding sites on the inorganic nanoparticle surface. Thus, as shown in FIG. 1(a), the protective ligands 2 (represented as thiol group-containing compounds) are bonded to entire surface of the particle 3 without gaps in the stabilized inorganic nanoparticle 1, whereby the protective ligand 2 are naturally arranged in the radial direction. In this case, while the inorganic nanoparticle is stabilized, it is difficult to bring a functional ligand into contact with the inorganic nanoparticle modified by the high-density protective ligands, and the functional ligand cannot be bonded to the inorganic nanoparticle without replacing the protective ligand. Thus, it is difficult to rapidly functionalize the inorganic nanoparticle.

On the other hand, it is believed that, as shown in FIG. 1(b), the stabilized inorganic nanoparticle 1 according to the first invention has a modification form in which the molecular skeletons of the protective ligands 2 bonded to the surface of the inorganic nanoparticle 3 in a low density are arranged in the tangential direction of the inorganic nanoparticle 3, and the free sites on the inorganic nanoparticle surface are efficiently covered with the molecular skeletons. Because of such a modification form, the inorganic nanoparticle is sufficiently stabilized, and a functional ligand is hardly inhibited from bonding to the free site and can easily replace the protective ligand.

In the production of the stabilized inorganic nanoparticle according to the first aspect of the invention, whether the induction period is always contained in the reaction regardless of the types of the inorganic nanoparticle, the protective ligand, and the stabilized inorganic nanoparticle production method or not has not been confirmed sufficiently. However, it has been clear from the knowledges obtained in the example of production of the stabilized inorganic nanoparticle containing the induction period that the stabilized inorganic nanoparticle containing the protective ligand in the critical amount or critical modification form is excellent in both the stability and the high reactivity to the functional ligand.

Thus, even in a case where the induction period is not found in the reaction for producing the stabilized inorganic nanoparticle, the time when the condition of the critical amount or the critical modification is satisfied can be determined by accumulating standard experiment data. The stabilized inorganic nanoparticle according to the first aspect of the invention can be obtained by stopping the reaction at the time. Further, the stabilized inorganic nanoparticle according to the first aspect of the invention can be obtained by selecting the mole ratio of the substances such as protective ligand in the reaction system such that the critical amount of the protective ligand is bonded to the inorganic nanoparticle, and in this case, there is no need to stop the reaction forcibly.

In the stabilized inorganic nanoparticle according to the first aspect of the invention, part of the functional ligand may be bonded to the nanoparticle via a reaction of replacing the protective ligand by the functional ligand. In this case, the bonding speed of the functional ligand depends on the substitution reactivity of the protective ligand. However, most of the functional ligand is rapidly bonded to the free site, so that the functionalization of the inorganic nanoparticle is substantially achieved. Thus, it is preferred that the protective ligand has a high substitution reactivity in the stabilized inorganic nanoparticle according to the first invention, though not essential.

In a second aspect of the invention, the stabilized inorganic nanoparticle of the first aspect of the invention satisfies the condition of (5) the nanoparticle is of a metal, a metal oxide, or a semiconductor substance, and/or (6) the nanoparticle has a particle diameter of 1 to 200 nm.

Though the material and the particle diameter of the inorganic nanoparticle, which acts as a core of the stabilized inorganic nanoparticle, may be selected without restrictions, and for example the inorganic nanoparticle preferably is made of a metal, a metal oxide, or a semiconductor substance, and preferably has a particle diameter of 1 to 200 nm.

In a third aspect of the invention, the protective ligand used in the stabilized inorganic nanoparticle of the first or second aspect of the invention is a compound having a molecular skeleton selected from (7) the group consisting of alkyl compound skeletons, aryl compound skeletons, and heterocyclic compound skeletons, and the compound has a functional group that is bonded to the binding site on the surface of the inorganic nanoparticle, selected from (8) the group consisting of a thiol group, a disulfide group, a phosphine group, an amino group, a carboxyl group, an isonitrile group, and a pyridyl group.

Though the type of the protective ligand may be selected without restrictions, and for example the protective ligand is preferably a compound having a molecular skeleton selected from the group of (7) and/or a functional group selected from the group of (8) that is bonded to the binding site on the inorganic nanoparticle surface.

In a fourth aspect of the invention, there is provided a stabilized inorganic nanoparticle material comprising a plurality of stabilized inorganic nanoparticles according to any one of the first to third aspects of the invention, wherein the stabilized inorganic nanoparticle material has an average particle diameter of 1 to 200 nm, and has such a particle diameter distribution that 90% or more of the stabilized inorganic nanoparticles have a particle diameter within a range of 10% above or below the average particle diameter.

The stabilized inorganic nanoparticle material having the versatile average particle diameter and the narrow particle diameter distribution range can be produced by the method to be hereinafter described. It is particularly preferred that the stabilized inorganic nanoparticle material has an average particle diameter of 1 to 200 nm and has such a particle diameter distribution that 90% or more of the nanoparticles have a particle diameter within a range of 10% above or below the average particle diameter.

In a fifth aspect of the invention, there is provided a method for producing a stabilized inorganic nanoparticle according to any one of the first to third aspects of the invention or a stabilized inorganic nanoparticle material according to the fourth aspect of the invention, comprising the steps of preparing the inorganic nanoparticle described in the second aspect of the invention in an appropriate reaction system under appropriate reaction conditions; initiating a reaction of bonding the protective ligand described in the third aspect of the invention to the inorganic nanoparticle while maintaining the inorganic nanoparticle stably; and stopping the reaction at (9) a time when it is judged, based on experimentally obtained standard data, that the amount of the protective ligand bonded to the inorganic nanoparticle is the critical amount of (1) or (2) described in the first aspect of the invention or that the form of modifying the surface of the inorganic nanoparticle by the protective ligand is the critical modification form of (4) described in the first aspect of the invention, or

(10) a time when it is judged, based on experimentally obtained standard data or based on temporal observation of the reaction by using an appropriate means without the standard data, that the reaction is in the induction period of (3) described in the first invention.

The stabilized inorganic nanoparticle of any one of the first to third aspects of the invention and the stabilized inorganic nanoparticle material of the fourth aspect of the invention can be preferably produced by the method according to the fifth aspect of the invention. The important point of the fifth aspect of the invention is the timing of stopping the reaction of bonding the protective ligand to the inorganic nanoparticle.

In a sixth aspect of the invention, there is provided a method for producing a stabilized inorganic nanoparticle according to any one of the first to third aspects of the invention or a stabilized inorganic nanoparticle material according to the fourth aspect of the invention, comprising the steps of experimentally obtaining the critical amount of (1) or (2) described in the first aspect of the invention; and carrying out a reaction for producing a stabilized inorganic nanoparticle while controlling a mole ratio between the protective ligand and the inorganic nanoparticle such that the critical amount is obtained in the reaction system.

The stabilized inorganic nanoparticle of any one of the first to third aspects of the invention and the stabilized inorganic nanoparticle material of the fourth aspect of the invention can be preferably produced also by the method according to the sixth aspect of the invention. The important point of the sixth aspect of the invention is the control of the mole ratio between the protective ligand and the material for the inorganic nanoparticle in the reaction system.

In a seventh aspect of the invention, the method of the fifth or sixth aspect of the invention further comprises, in the case of using a metal nanoparticle as the inorganic nanoparticle, the steps of preparing an aqueous solution of a metal salt used as a material for the metal nanoparticle; bringing the aqueous solution into contact with a toluene phase containing the protective ligand and a phase transfer agent; and reducing the toluene phase to initiate a reaction of generating the metal nanoparticle and a reaction of bonding the protective ligand to the metal nanoparticle.

In the fifth and sixth aspects of the invention, the reaction system and reaction conditions are not particularly limited as long as the excellent stabilized inorganic nanoparticle can be produced by the methods. The methods can be preferably carried out in accordance with the seventh aspect of the invention. The method of the seventh aspect of the invention is based on the above-mentioned method of Brust et al. except for the characteristics of the invention.

In an eighth aspect of the invention, the stabilized inorganic nanoparticle produced by the method according to any one of the fifth to seventh aspects of the invention has an average particle diameter controlled by selecting a reaction agent concentration, a reaction temperature, or a reaction time in the reaction system.

It is important that the stabilized inorganic nanoparticle has a narrow particle diameter distribution, and further, the average particle diameter of the stabilized inorganic nanoparticle is preferably selected depending on the use thereof. The inventors has confirmed that the average particle diameter can be changed by controlling various factors described in the eighth aspect of the invention.

In a ninth aspect of the invention, the reaction of bonding the protective ligand to the inorganic nanoparticle as described in the fifth, seventh, or eighth aspect of the invention is stopped by

(11) inactivation of an agent controlling the reaction of generating the inorganic nanoparticle including at least an agent for the reduction in the seventh aspect of the invention, and/or

(12) dilution of a reaction solution.

The reaction of bonding the protective ligand to the inorganic nanoparticle has to be stopped at the required timing in the fifth aspect of the invention and so forth and the means of (11) and/or (12) of the ninth aspect of the invention are preferably used for stopping the reaction.

In a tenth aspect of the invention, there is provided a method for using a stabilized inorganic nanoparticle, comprising bonding a functional ligand to a stabilized inorganic nanoparticle according to any one of the first to third aspects of the invention or a stabilized inorganic nanoparticle material according to the fourth aspect of the invention, to obtain a functional inorganic nanoparticle with an additional characteristic or function.

In the tenth aspect of the invention, the functional inorganic nanoparticle can be obtained by bonding the functional ligand to the inorganic nanoparticle. In this case, the stabilized inorganic nanoparticle of the first to third aspects of the invention or the stabilized inorganic nanoparticle material of the fourth aspect of the invention is used as a starting material, and thus the functionalization of the inorganic nanoparticle can be rapidly achieved without difficulties in characterizing or storing the material as described above.

In an eleventh aspect of the invention, the functional inorganic nanoparticle described in the tenth aspect of the invention is such that (A) the functional ligand is bonded to a free site of the stabilized inorganic nanoparticle or (B) the functional ligand is bonded to a free site of the stabilized inorganic nanoparticle and a protective ligand is replaced by another functional ligand.

It is particularly preferred that the functional inorganic nanoparticle obtained by the method of the tenth aspect of the invention contains the functional ligand as described in (B) of the eleventh aspect of the invention from the viewpoint of the amount of the functional ligand bonded.

In a case where the protective ligand in the stabilized inorganic nanoparticle is poor in substitution reactivity and the substitution reaction is rapidly stopped, the resultant nanoparticle may contain the functional ligand in the manner of (A) of the eleventh aspect of the invention. However, the amount of the functional ligand is greatly larger than that of the protective ligand even in this case, so that the resultant nanoparticle can be preferably used as a functional inorganic nanoparticle.

In a twelfth aspect of the invention, the functional ligand used in the tenth or eleventh aspect of the invention is one or more selected from the group consisting of

(13) ligands capable of specifically bonding to a bioactive molecule including at least a DNA and a protein,

(14) luminescent ligands including at least fluorescent ligands and phosphorescent ligand,

(15) ligands capable of specifically bonding to a particular ion or chemical species,

(16) ligands having an electrically conductive or superconductive property,

(17) ligands having an electroluminescent property,

(18) ligands having a nonlinear optical property, and

(19) ligands having a laser emission property.

The type of the functional ligand for the functional inorganic nanoparticle is not limited at all, and preferred examples thereof include the above ligands described in the twelfth aspect of the invention.

DETAILED DESCRIPTION OF THE INVENTION

Figure 1:
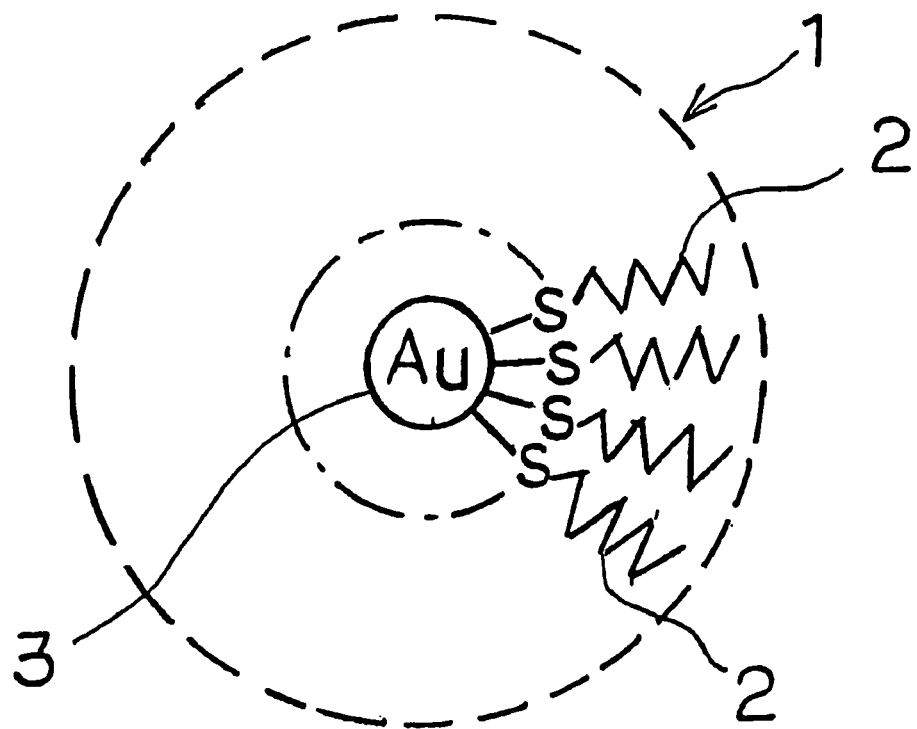
FIG. 1 is an explanatory view showing a form of modifying an inorganic nanoparticle by a protective ligand.
Figure 1:
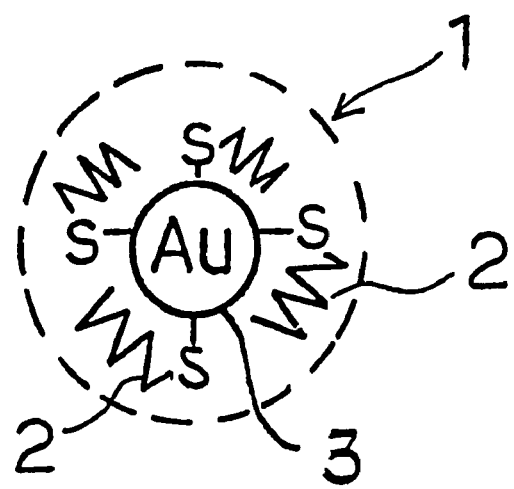

A preferred embodiment and best mode of the first to twelfth aspects of the present invention will be described below. The term "the invention" in the following description means corresponding ones among the first to twelfth inventions.

[Inorganic Nanoparticle and Protective Ligand]

The stabilized inorganic nanoparticle of the invention comprises the inorganic nanoparticle and the protective ligand, and the components are described below first.

The inorganic nanoparticle is a nanometer-size particle of an inorganic material. Though the shape of the inorganic nanoparticle is often shown in drawings as spherical, the shape may be nonuniform practically, and may be an approximately spherical shape, a slightly flattened shape, a three-dimensionally angulated shape, etc. in the invention.

Also the material for the inorganic nanoparticle is not particularly limited as long as the material can form a nanoparticle with a utility value. Typical, preferred examples of the materials include metals, metal oxides, and semiconductor substances. The types of the metals are not particularly limited, and preferred examples thereof include gold, platinum, and silver. The types of the metal oxides are not particularly limited too, and preferred examples thereof include titanium oxide, zirconium oxide, molybdenum oxide, silicon oxide, and tungsten oxide. The types of the semiconductor substances are not particularly limited too, and preferred examples thereof include cadmium selenide, gallium arsenide, and silicon.

The particle diameter of the inorganic nanoparticle, which is used as a core of the stabilized inorganic nanoparticle, may be selected from various ones in accordance with the intended use. For example, the particle diameter is preferably 1 to 200 nm, particularly preferably 1 to 5 nm. Further, it is preferred that the average particle diameter of the nanoparticle cores in the stabilized inorganic nanoparticle material is within the above particle diameter range. The particle diameter distribution of the stabilized inorganic nanoparticle material is preferably such a narrow distribution that 90% or more of the nanoparticles have a particle diameter within a range of 10% above or below the average particle diameter. It is more preferred that 95% or more of the nanoparticles have a particle diameter within this range.

In the invention, the protective ligand is a compound that has a functional group capable of bonding to a binding site on the inorganic nanoparticle surface (e.g. a binding site of a surface metal atom on a metal nanoparticle) and has a modification effect for stabilizing the inorganic nanoparticle. The type of the protective ligand is not limited as long as it has the functional group and the modification effect, and extremely various protective ligands can be used in the invention.

Particularly preferred examples of the functional groups capable of bonding to the inorganic nanoparticle include a thiol group, a disulfide group, a phosphine group, an amino group, a carboxyl group, an isonitrile group, and a pyridyl group. The substitution reactivities of the functional groups in common chemical reactions are not necessarily important. Examples of molecular skeletons of the protective ligand include alkyl compound skeletons, aryl compound skeletons, and heterocyclic compound skeletons. In other words, examples of the molecular skeletons of the protective ligand include linear alkanes, branched alkanes, aromatic ring-containing alkanes, and heterocyclic compound-containing alkanes. These alkanes particularly preferably have 4 to 30 carbon atoms. The protective ligand may have a plurality of the same or different functional groups on the above molecular skeleton.

[Stabilized Inorganic Nanoparticle]

The stabilized inorganic nanoparticle of the invention is the inorganic nanoparticle stabilized by the protective ligand bonded to the binding site on the particle surface. The stabilized inorganic nanoparticle is significantly characterized in that the protective ligand is bonded only to a part of the binding sites on the particle surface, and most of the binding sites remain as unbonded free sites.

In the stabilized inorganic nanoparticle, the amount of the protective ligand bonded is remarkably insufficient stoichiometrically. However, when the amount is a critical amount to be hereinafter described, or when the form of the modification with the protective ligand is a critical modification form to be hereinafter described, the inorganic nanoparticle is sufficiently stabilized. Further, a sufficient amount of a functional ligand can be rapidly bonded with ease to the inorganic nanoparticle core of such a stabilized inorganic nanoparticle.

[Critical Amount]

The critical amount of the protective ligand bonded to the inorganic nanoparticle may be defined in several manners as described below.

According to the most adequate definition for the purpose, the critical amount is defined as an amount between a lower limit required for stabilizing the inorganic nanoparticle and an upper limit at or below which a functional ligand is substantially not inhibited from bonding to the inorganic nanoparticle by the protective ligand. When the above-described extent of the substantial inhibition is clearly determined in a stabilized inorganic nanoparticle synthesizing system, it is not difficult to produce the stabilized inorganic nanoparticle with thus defined critical amount through an experimental trial and error process.

According to the most quantitative definition, the critical amount is defined as an amount required for bonding the protective ligand to 8% to 30% of the binding sites on the inorganic nanoparticle surface while maintaining the stability and high reactivity of the inorganic nanoparticle. It is particularly preferred that the critical amount is an amount required for bonding the protective ligand to 10% to 20% of the binding sites. When the shape and diameter of a certain inorganic nanoparticle such as a gold nanoparticle are determined, the number of binding sites on the particle surface (the number of gold atoms on the particle surface) can be obtained by calculation, and also the critical amount according to this definition can be obtained by calculation. Thus, when increase in the amount of the bonded protective ligand to the inorganic nanoparticles in a stabilized inorganic nanoparticle synthesizing system is shown with time as a standard curve based on certain experiments, it is not difficult to produce the stabilized inorganic nanoparticle with thus defined critical amount.

According to the most practical definition, the critical amount is defined as, in a case where the reaction for bonding the protective ligand to the inorganic nanoparticle proceeds slowly in an induction period and then proceeds rapidly in a bond forming period, an amount of the protective ligand bonded at a time when the reaction is stopped before the completion of the induction period. In Examples hereinafter described, an excellent stabilized inorganic nanoparticle was produced using this definition. Whether the induction period is observed in every stabilized inorganic nanoparticle synthesizing systems or not has not been confirmed sufficiently.

[Critical Modification Form]

The critical modification form is defined as a form with a spatial arrangement in which the molecular skeleton of the protective ligand bonded to the binding site is arranged in the tangential direction of the inorganic nanoparticle, and the free site of the inorganic nanoparticle is covered with the molecular skeleton.

This modification form is shown in FIG. 1(b). A specific, reasonable explanation can be made based on the modification form on the characteristic that the functional ligand is not prevented from bonding to the inorganic nanoparticle and substituting the bonded protective ligand while the inorganic nanoparticles are prevented from connecting or aggregating to each other.

[Method for Producing Stabilized Inorganic Nanoparticle]

The inventors have found that the above-described, particular induction period is contained in the reaction of bonding the protective ligand to the inorganic nanoparticle in the method for producing the stabilized inorganic nanoparticle according to Examples hereinafter described. Whether the induction period is observed in every stabilized inorganic nanoparticle synthesizing systems or not has not been confirmed. However, the advantageous effects of the stabilized inorganic nanoparticle according to the invention can be obtained regardless of whether the induction period is contained in the reaction or not as long as the protective ligand is in the critical amount or the critical modification form. Thus, the following first to third methods can be used as the method of the invention for producing the stabilized inorganic nanoparticle.

(First Production Method)

In a first production method, an excellent stabilized inorganic nanoparticle (or a excellent stabilized inorganic nanoparticle material) is produced by the steps of preparing the above inorganic nanoparticle; initiating the reaction of bonding the protective ligand to the inorganic nanoparticle while maintaining the inorganic nanoparticle in the stable particle state; and stopping the reaction when it is judged, based on experimentally obtained standard data, that the amount of the protective ligand bonded to the inorganic nanoparticle is the critical amount or that the form of modifying the inorganic nanoparticle by the protective ligand is the critical modification form.

In the first production method, a means for stopping the reaction of bonding the protective ligand to the inorganic nanoparticle is not particularly limited as long as it does not inhibit the function of the stabilized inorganic nanoparticle. The reaction is preferably stopped by (11) inactivation of an agent controlling the reaction of generating the inorganic nanoparticle including at least an agent for the reduction recited in claim 7, and/or (12) dilution of the reaction solution.

(Second Production Method)

A second production method is used in a case where the reaction of bonding the protective ligand to the inorganic nanoparticle contains the induction period. In the second production method, an excellent stabilized inorganic nanoparticle (or a excellent stabilized inorganic nanoparticle material) is produced by the steps of preparing the inorganic nanoparticle; initiating the reaction of bonding the protective ligand while maintaining the inorganic nanoparticle in the stable particle state; and stopping the reaction when it is judged, based on experimentally obtained standard data or based on temporal observation of the reaction by using an appropriate means without the standard data, that the reaction is in the induction period.

The temporal observation by using an appropriate means is not limited as long as it can achieve the purpose. For example, the photoabsorption spectrum of the reaction liquid may be observed at a particular wavelength range, and the change in the amount of the protective ligand bonded may be temporally checked by the observation.

In the second production method, the reaction of bonding the protective ligand to the inorganic nanoparticle is preferably stopped by the means of (11) and/or (12).

(Third Production Method)

A third production method is used in a case where the critical amount of the protective ligand bonded is clarified beforehand. In the third production method, a reaction of synthesizing the stabilized inorganic nanoparticle is carried out while controlling the mole ratio of the protective ligand to the inorganic nanoparticle or the material therefor in the reaction system such that the critical amount of the protective ligand is bonded to the inorganic nanoparticle as a result. In the third production method, it is preferred that the protective ligand is prevented from bonding only to a certain inorganic nanoparticle in a concentrated manner by sufficiently stirring the reaction system, etc.

(Embodiment of Method for Producing Stabilized Inorganic Nanoparticle)

More specifically, the first to third production methods may be carried out in the following manner.

In the case of using a metal nanoparticle (particularly a gold nanoparticle) as the inorganic nanoparticle, first an aqueous solution of a metal salt used as a material for the metal nanoparticle is prepared, and the aqueous solution is brought into contact with a toluene phase containing the protective ligand and a phase transfer agent, to transfer an ion derived from the metal salt to the toluene phase. Then, the toluene phase is reduced, whereby a reaction of generating the metal nanoparticle and a reaction of bonding the protective ligand to the generated metal nanoparticle are initiated to obtain the stabilized inorganic nanoparticle.

(Control of Average Particle Diameter in Method for Producing Stabilized Inorganic Nanoparticle)

The stabilized inorganic nanoparticle obtained by the above production methods has a narrow particle diameter distribution. It is important to appropriately control the average particle diameter in accordance with the intended use. The average particle diameter of the stabilized inorganic nanoparticle can be controlled by changing the reaction agent concentration, reaction temperature, or reaction time in the reaction system. For example, the higher the reaction temperature is, the larger the average particle diameter becomes. Further, the longer the reaction time is, the larger the average particle diameter becomes.

[Method for Using Stabilized Inorganic Nanoparticle]

In the method of the invention for using the stabilized inorganic nanoparticle, a functional ligand is bonded to the stabilized inorganic nanoparticle to obtain a functional inorganic nanoparticle with an additional characteristic or function.

In this case, the functional ligand is bonded sufficiently to the free sites of the stabilized inorganic nanoparticle. In a case where the protective ligand is easily replaced by the functional ligand, the functional ligand is sufficiently bonded by substitution to the binding sites, to which the protective ligand has been bonded. In a case where the protective ligand is not easily replaced by the functional ligand, the rate of substituting the protective ligand with the functional ligand depends on the time of the reaction for bonding the functional ligand, and the like.

Even in a case where a part of the protective ligand molecules are not replaced and remain on the functional inorganic nanoparticle surface, the amount of the functional ligand bonded is greatly larger than the critical amount of the protective ligand, so that the resultant functional inorganic nanoparticle can be used practically.

The type of the functional ligand is not limited as long as it has a functional group capable of bonding to the inorganic nanoparticle and a moiety capable of functionalizing or characterizing the inorganic nanoparticle. For example, the functional ligand may be one or more selected from the group consisting of

(13) ligands capable of specifically bonding to a bioactive molecule including at least a DNA and a protein,

(14) luminescent ligands including at least fluorescent ligands and phosphorescent ligand,

(15) ligands capable of specifically bonding to a particular ion or chemical species,

(16) ligands having an electrically conductive or superconductive property,

(17) ligands having an electroluminescent property,

(18) ligands having a nonlinear optical property, and

(19) ligands having a laser emission property.

EXAMPLES

Examples of the present invention will be described below without intention of restricting the scope of the invention.

Example 1

Synthesis of Stabilized Gold Nanoparticle

A toluene solution of tetraoctylammonium bromide (1.63 g/60 mL) was added to a round-bottom flask containing an aqueous $HAuCl_4$ solution (0.30 g/22.5 mL of a deionized pure water). The resultant mixture was stirred until the $AuCl_4^-$ ions were transferred to the toluene layer, so that the toluene layer exhibited a characteristic red color and the water layer became colorless. The tetraoctylammonium bromide was used as a phase transfer agent for transferring the $AuCl_4^-$ ions to the toluene layer.

Then, the water layer was removed carefully, the temperature of the toluene layer was controlled at 30° C., and 0.15 mL of a protective ligand of tert-dodecanethiol was added thereto. About 1 hour after the addition, the color of the toluene layer was changed from red to pale yellow or orange. The color change of the toluene layer represented that a reaction of bonding tert-dodecanethiol to the gold ion was conducted by adding the tert-dodecanethiol to the toluene.

An $NaBH_4$ boric acid buffer solution (0.3 g/19 mL) was added to the toluene layer while stirring, so that the toluene layer exhibited a dark burgundy color. The color change of the toluene layer represented that the gold ions were reduced by the addition of $NaBH_4$ to generate atomic gold, which started to form a cluster.

45 minutes after the addition of $NaBH_4$, the water layer was removed carefully, and the obtained toluene layer was washed with a 1-M sodium chloride solution. Then, the toluene layer was washed with pure water, dried over sodium sulfate ($Na_2SO_4$), and concentrated by a flash evaporator under 20 to 30 mmHg at a temperature as low as possible. To the concentration residue was added ethanol dropwise, so that a dark colored solid was generated as a precipitate. The precipitate is a stabilized gold nanoparticle according to the invention. The precipitate was isolated by centrifugation, washed with ethanol, dried under reduced pressure, and then stored in a refrigerator.

The stabilized gold nanoparticle was produced at a yield of 250 mg. The stabilized gold nanoparticle was subjected to an elemental analysis, and the results thereof were as follows: C=4.62%, H=0.81%, and N=0.06%.

Example 2

Characterization of Stabilized Gold Nanoparticle 5.653 mg of a sample of the stabilized gold nanoparticle produced in Example 1 was subjected to an ultraviolet-visible spectrum analysis. As a result, the absorbance at a wavelength of 510 nm was reduced and the absorbance in a wavelength range of 550 nm or more was increased with the reaction time.

The reaction time means the elapsed time of the reactions of generating the gold nanoparticle and bonding the protective ligand thereto, which were initiated by adding $NaBH_4$ to the toluene layer. In Example 1, the bonding reaction was stopped forcibly by diluting the reaction liquid (by adding pure water to the toluene layer), and thus the reaction time more specifically means the elapsed time from when $NaBH_4$ was added till when the pure water was added.

Figure 2:
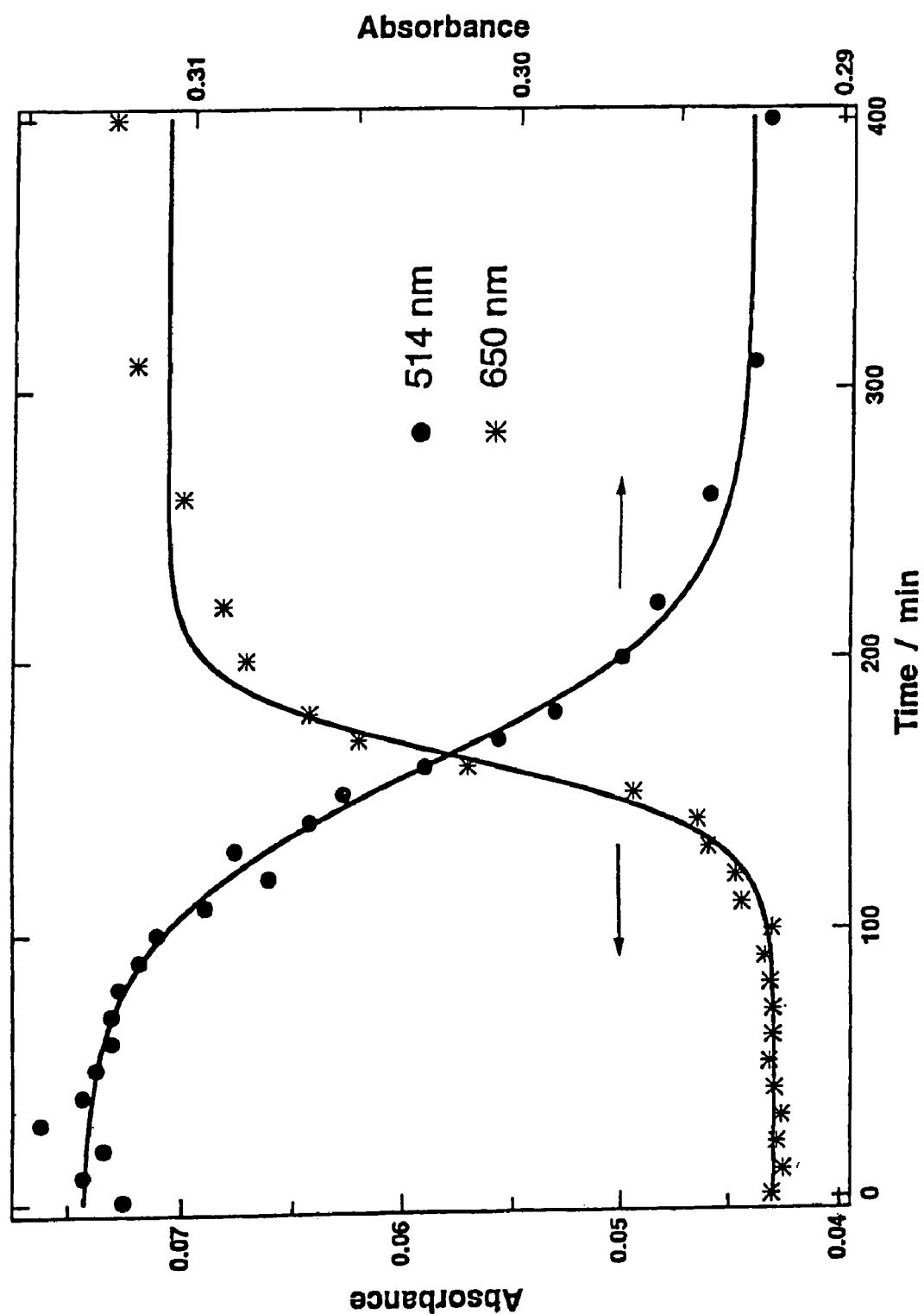
FIG. 2 is a graph showing temporal changes of absorbances at certain wavelengths in a reaction liquid.

The reaction mixture of Example 1 added with $NaBH_4$ was subjected to an ultraviolet-visible spectrum measurement under various reaction times (various elapsed times from the addition of $NaBH_4$), and FIG. 2 is a graph showing plasmon absorbances of the reaction mixture at wavelengths of 514 and 650 nm with the reaction time, which are data obtained based on the measurement results (not shown). The absorbance decrease at the wavelength of 514 nm represents the decrease of the gold nanoparticles with no protective ligands and the gold nanoparticles having a protective ligand amount of less than the critical amount. The absorbance increase at the wavelength of 650 nm represents the increase of gold nanoparticles having a protective ligand amount of more than the critical amount, the protective ligand being bonded to most or all of the binding sites on the particle surface.

As is clear from FIG. 2, the spectra were only slightly changed for approximately 2 hours in the induction period of the reaction, and then were sharply changed because the tert-dodecanethiol molecules were rapidly bonded to the nanoparticle surfaces.

Thus, after the completion of the induction period, the protective ligand is rapidly bonded to the gold nanoparticles to generate stabilized gold nanoparticles poor in reactivity with functional ligands. On the other hand, when the reaction of bonding the protective ligand to the gold nanoparticles is stopped before the completion of the induction period, stabilized gold nanoparticles excellent in the reactivity with functional ligands can be obtained. The reactivities of the stabilized gold nanoparticles are confirmed in the following example.

Example 3

Critical Amount, Etc.

Samples 1 and 2 of the stabilized gold nanoparticles having a high reactivity with functional ligands, produced in the same manner as Example 1, were subjected to an elemental analysis for carbon, hydrogen, and nitrogen. The ratio between the number X of the binding sites on the gold nanoparticle surfaces (the number of surface gold atoms on the gold nanoparticles) and the number Y of molecules of the protective ligand (tert-dodecanethiol) bonded to the gold nanoparticles was calculated using the elemental analysis results. The results are as follows.

Sample 1: The gold nanoparticles, which were used as cores of the stabilized gold nanoparticles, had an average particle diameter of 3 nm. Thus, on the assumption that the gold nanoparticles are spherical, the above number X is calculated to be 390. The elemental analysis results are as follows.

C=6.95%

H=1.09%

N=0.06%

On the other hand, the elemental composition calculated for $Au_{976}(t\text{-}dct)_{77}(TOA)_9$ is as follows. In the formula, "t-dct" represents tert-dodecanethiol, and "TOA" represents tetraoctylammonium.

C=6.866%

H=1.24%

N=0.0595%

S=1.16%

As a result, Y was calculated to be X/5.1. Thus, it is clear that the protective ligand was bonded to just under 20% of the binding sites of the gold nanoparticles.

Sample 2: The gold nanoparticles, which were used as cores of the stabilized gold nanoparticles, had an average particle diameter of 3.2 nm. Thus, on the assumption that the gold nanoparticles are spherical, the above number X is calculated to be 482. The elemental analysis results are as follows.

C=4.62%

H=0.81%

N=0.06%

On the other hand, the elemental composition calculated for $Au_{1289}(t\text{-}dct)_{55}(TOA)_{12}$ is as follows.

C=4.63%

H=0.836%

N=0.062%

S=0.65%

As a result, Y was calculated to be X/8.8. Thus, it is clear that the protective ligand was bonded to slightly over 10% of the binding sites of the gold nanoparticles.

From the calculation results of Samples 1 and 2, and the other several samples, the critical amount is considered to be such that the protective ligand is bonded to 8% to 30% of the binding sites on the gold nanoparticle, particularly preferably such that the protective ligand is bonded to 10% to 20% thereof. Further, the modification form of the protective ligand is considered to be such as shown in FIG. 1(b).

Example 4

Stabilized Gold Nanoparticle after Preparation

Figure 3:
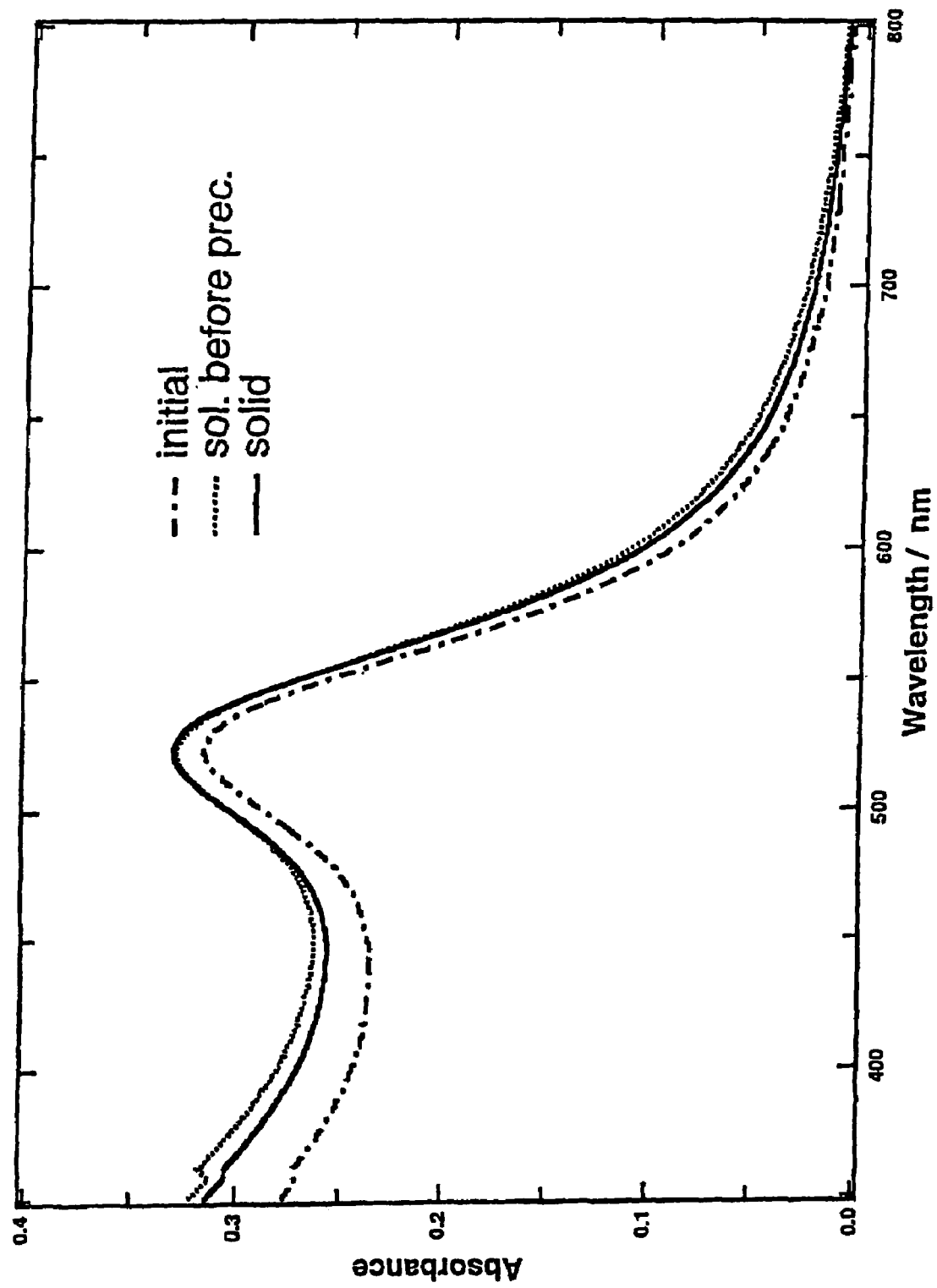
FIG. 3 is a graph showing ultraviolet-visible spectra of a reaction mixture with time.

In FIG. 3, an ultraviolet-visible spectrum of the reaction mixture measured immediately after initiating the reaction using $NaBH_4$ in Example 1 is shown as "initial", an ultraviolet-visible spectrum of the concentration residue measured immediately before adding ethanol dropwise to generate the precipitate is shown as "sol. before prec.", and an ultraviolet-visible spectrum of the solid isolated as the precipitate is shown as "solid". The spectrum lines shown in FIG. 3 are similar to each other, whereby it is clear that the amount of the thiol compound bonded to the nanoparticles of the solid was not significantly changed from the amount obtained immediately after initiating the reaction.

Figure 4:
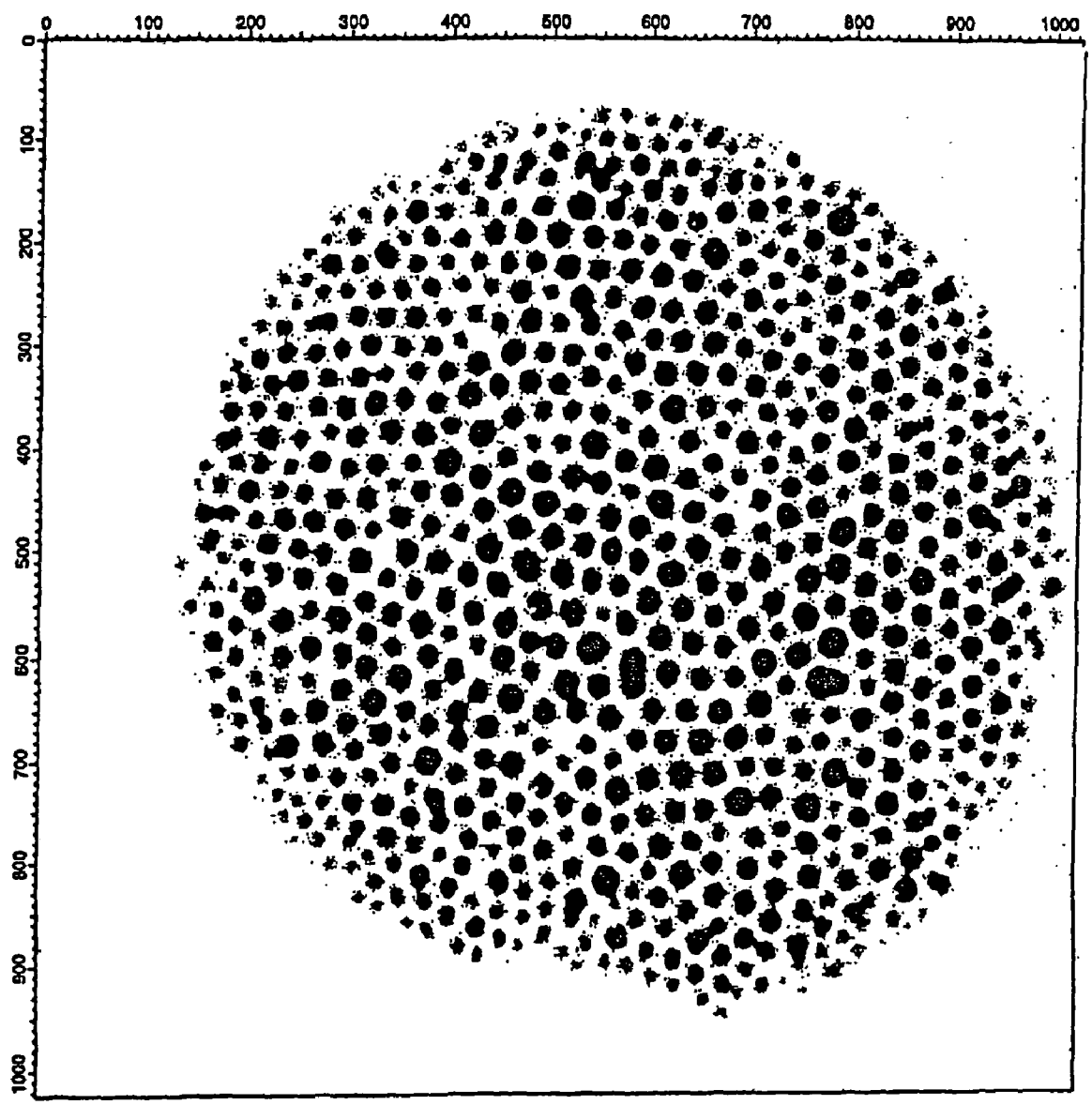
FIG. 4 is a TEM photograph showing a stabilized inorganic nanoparticle material obtained in Examples.
Figure 5:
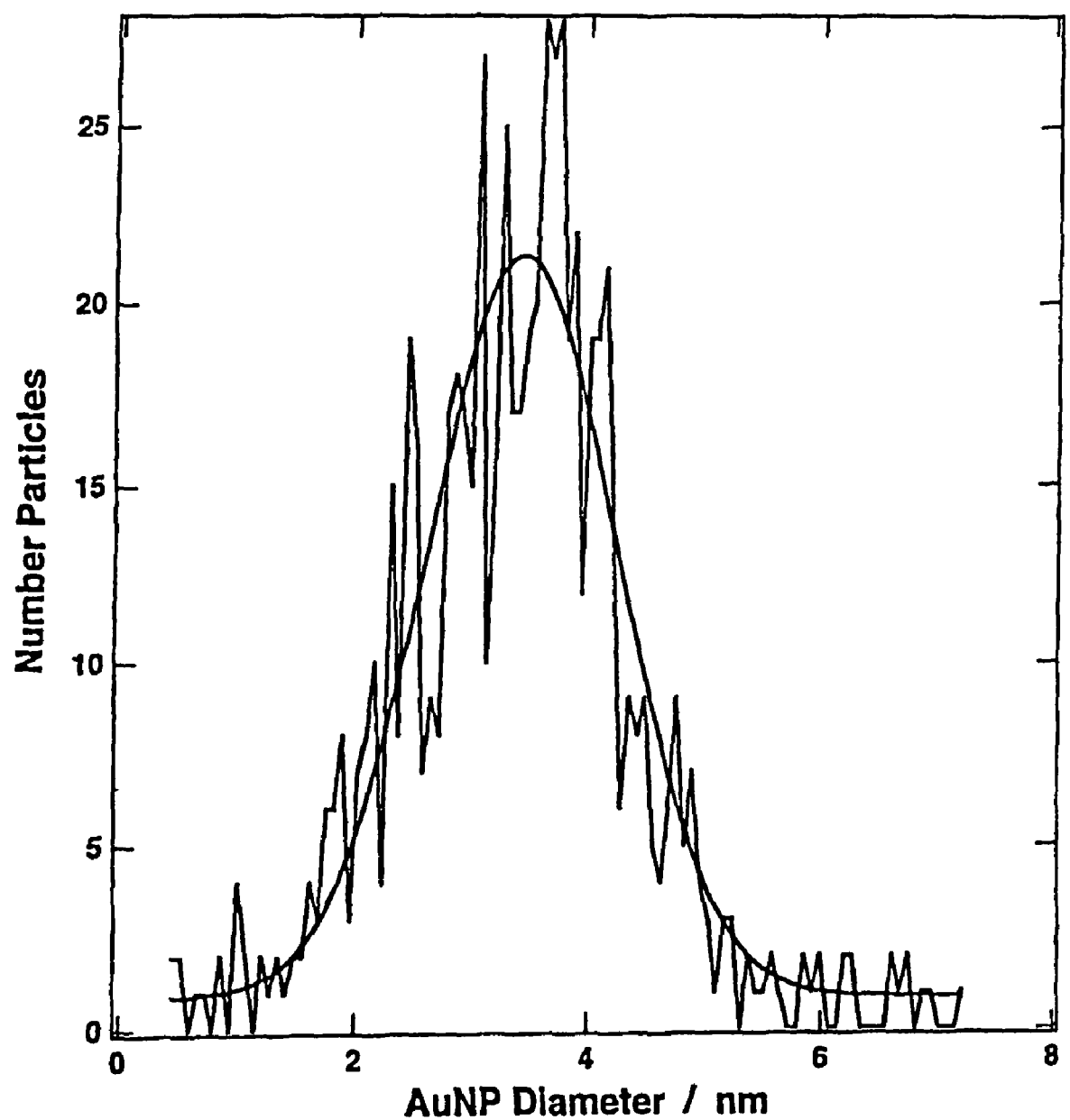
FIG. 5 is a graph showing a particle diameter distribution of the stabilized inorganic nanoparticle material obtained in Examples.

A typical TEM image of the obtained functional gold nanoparticles is shown in FIG. 4, and a histogram of the particle diameter distribution of the functional gold nanoparticles is shown in FIG. 5. The average particle diameter of the functional gold nanoparticles was calculated using the histogram of FIG. 5 to be 3.3±1.0 nm. Further, a toluene solution of the functional gold nanoparticles was air-dried at a boundary of water-air, to obtain a single layered aggregate. In the aggregate, the nanoparticles with larger diameters were gathered in the center, and the nanoparticles with smaller diameters were distributed around the periphery.

Example 5

Activity of Stabilized Gold Nanoparticle for Bonding to Functional Ligand

Figure 6:
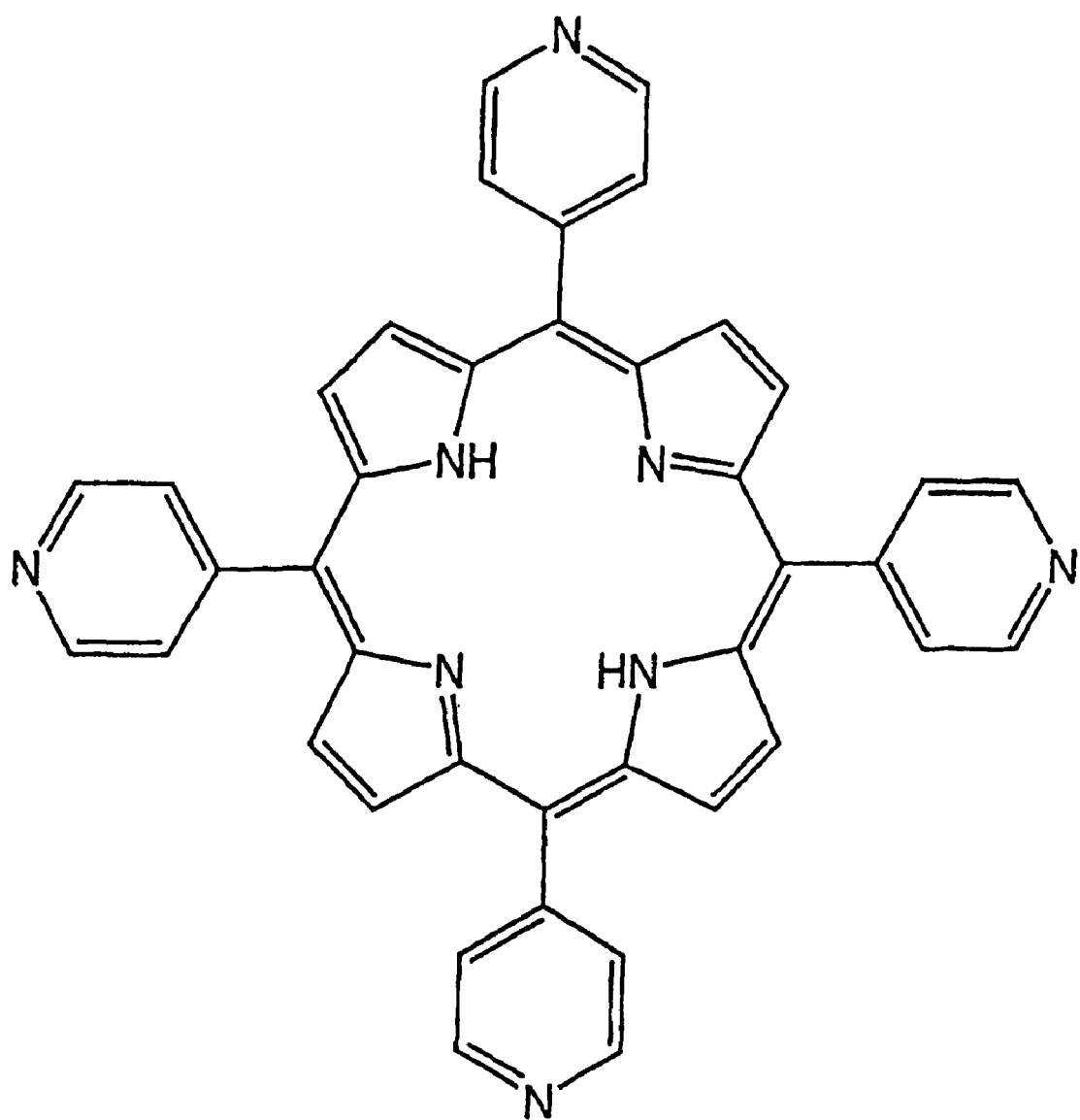
FIG. 6 is a view of a functional ligand used in Examples.

In Example 5, the term "a stabilized gold nanoparticle according to Examples" means such a stabilized gold nanoparticle that the amount of the protective ligand bonded to the gold nanoparticle is in the range of the critical amount, and the term "a conventional stabilized gold nanoparticle" means such a stabilized gold nanoparticle that the protective ligand is bonded to most or all of the binding sites on the gold nanoparticle surface. Meso-Tetrapyridylporphyrin (TPyP) shown in FIG. 6 was used as a functional ligand.

Figure 7:
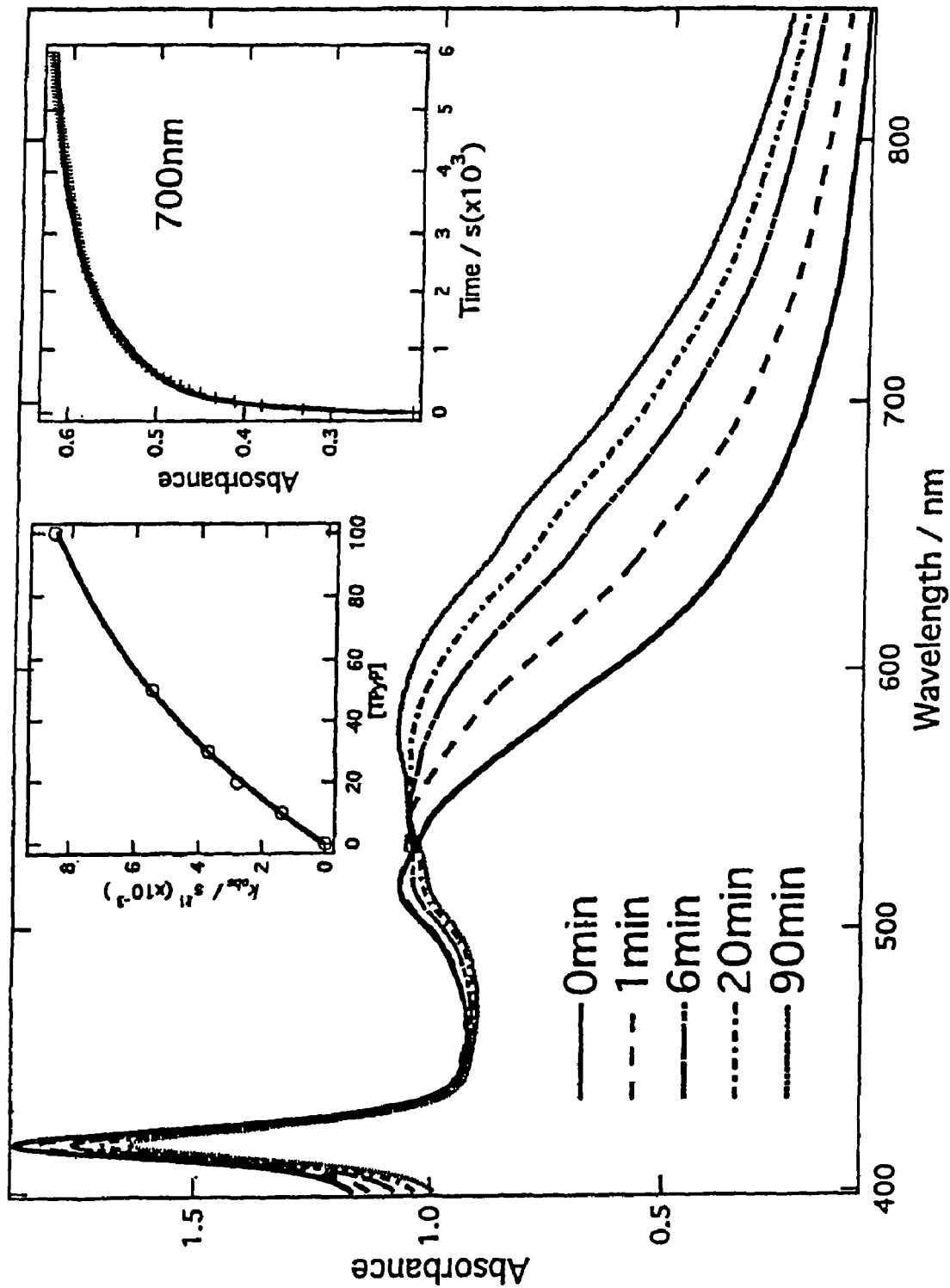
FIG. 7 is a graph showing a bonding reactivity of a stabilized gold nanoparticle according to Examples.

The graph of FIG. 7 shows a temporal change of absorption spectra in the case of adding 100 μL of a 0.1 g/L toluene solution of the stabilized gold nanoparticle according to Examples to 3 mL of a $1.2 \times 10^{-4}$ mol/L TPyP chloroform solution. In FIG. 7, a spectrum represented as "0 min" is measured immediately after the addition of TPyP, and spectra represented as "1 min" to "90 min" are measured 1 to 90 minutes after the addition of TPyP respectively. It is clear from FIG. 7 that the spectrum of "0 min" had a plasmon absorption at approximately 520 nm, and the plasmon absorption was shifted to at approximately 600 nm as the reaction with TPyP proceeded.

A temporal change of the absorbance at 700 nm is shown in an additional graph in the upper right of FIG. 7. The rate constant $K_{obs}$ of the reaction for bonding the functional ligand to the stabilized gold nanoparticle according to Examples can be obtained using the additional graph. The dependence of thus-obtained $K_{obs}$ on the TPyP concentration is shown in an additional graph at the upper center of FIG. 7.

Figure 8:
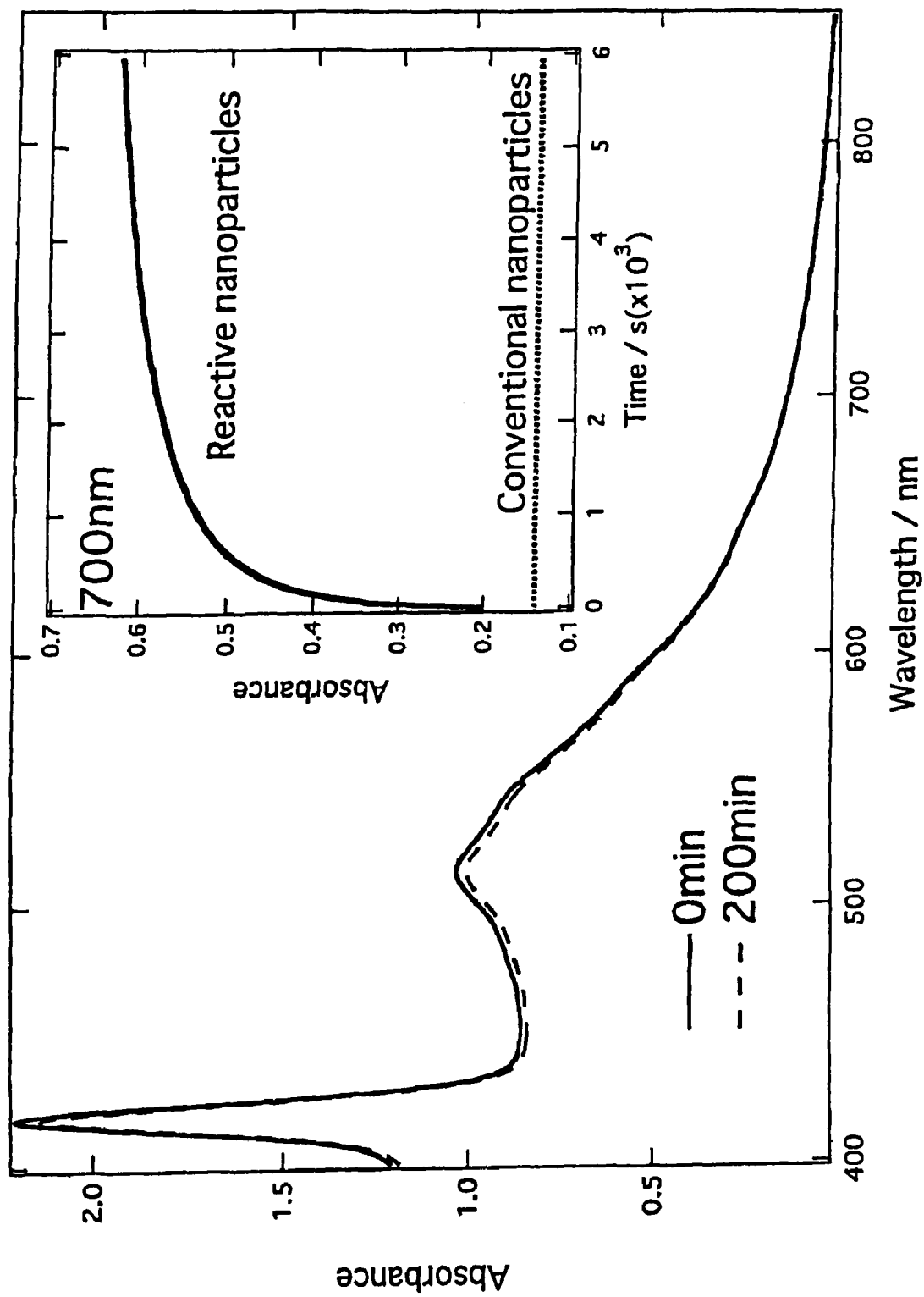
FIG. 8 is a graph showing a bonding reactivity of a conventional stabilized gold nanoparticle.

The conventional stabilized gold nanoparticle was subjected to the same experiments as above under the same conditions. The results are shown in FIG. 8. In FIG. 8, the spectrum of "200 min" measured 200 minutes after the addition of TPyP is substantially not different from the spectrum of "0 min" measured immediately after the addition of TPyP. Thus, it is found that the rate of the reaction for bonding the functional ligand to the conventional stabilized gold nanoparticle was significantly low.

A temporal change of the absorbance at 700 nm was obtained within a range of 100 minutes from the TPyP addition, and is shown as "Conventional nanoparticles" in an additional graph in the upper right of FIG. 8. Further, a part within a range of 100 minutes, of the data in the upper right of FIG. 7, is copied and shown as "Reactive nanoparticles" in the additional graph of FIG. 8.

It is clear from the additional graph in the upper right of FIG. 8 that (a) the reaction of bonding the functional ligand to the stabilized gold nanoparticle according to Examples was substantially completed about 1 hour after the addition, and (b) the reaction of bonding the functional ligand to the conventional stabilized gold nanoparticle was significantly slow such that the reaction was hardly detected in 1 hour.

According to the present invention, there is provided a stabilized inorganic nanoparticle that is stabilized by a protective ligand and can be rapidly functionalized with ease by bonding a functional ligand thereto.

The invention claimed is:

1. A stabilized inorganic nanoparticle obtained by bonding protective ligands to a surface of an inorganic nanoparticle having a plurality of binding sites on its surface to stabilize the inorganic nanoparticle, wherein
one part of the binding sites on the surface of the inorganic nanoparticle are bonded to the protective ligand, the other part of the binding sites remain as a free sites not bonded to protective ligands, and the stabilized inorganic nanoparticle satisfies a condition that either the amount of the protective ligand bonded to the inorganic nanoparticle is a critical amount, or the condition that the form of the protective ligand-modified surface of the inorganic nanoparticle by the protective ligand is a critical modification form, wherein, when the amount of protective ligand bound to the inorganic nanoparticle is a critical amount,
the critical amount is defined as one of
(1) an amount between a lower limit required for stabilizing the inorganic nanoparticle and an upper limit at or below which a functional ligand is capable of bonding to the inorganic nanoparticle without interference from bound protective ligand, or
(2) an amount required for bonding the protective ligand to 8% to 30% of the binding sites on the surface of the inorganic nanoparticle without hindering either the stability of the inorganic nanoparticle or the reactivity of remaining binding sites, and further wherein, when the form of the protective ligand-modified surface is a critical modification form,
critical modification form is defined as
(3) a form with a spatial arrangement in which the molecular skeleton of the protective ligands are arranged along a tangent to the surface of the inorganic nanoparticle, and the free sites on the surface of the inorganic nanoparticle are covered with the molecular skeleton.

2. The stabilized inorganic nanoparticle according to claim 1, wherein the inorganic nanoparticle satisfies the conditions of (4) the nanoparticle is of a metal, a metal oxide, or a semiconductor substance, and/or
(5) the nanoparticle has a particle diameter of 1 to 200 nm.

3. The stabilized inorganic nanoparticle according to claim 1, wherein
the protective ligand is a compound having a molecular skeleton selected from:
the group consisting of alkyl compound skeletons, aryl compound skeletons, and heterocyclic compound skeletons, and
the compound has a functional group that is bonded to the binding site on the surface of the inorganic nanoparticle, the functional group being selected from
(6) the group consisting of a thiol group, a disulfide group, a phosphine group, an amino group, a carboxyl group, an isonitrile group, and a pyridyl group.

4. A stabilized inorganic nanoparticle material comprising a plurality of stabilized inorganic nanoparticles according to claim 1, wherein the stabilized inorganic nanoparticle material has an average particle diameter of 1 to 200 nm, and has such a particle diameter distribution that 90% or more of the stabilized inorganic nanoparticles have a particle diameter within a range of 10% above or below the average particle diameter.

5. A method for producing the stabilized inorganic nanoparticle of claim 1, comprising the steps of experimentally obtaining the critical amount of (1) or (2) recited in claim 1; and carrying out a reaction for producing a stabilized inorganic nanoparticle while controlling a mole ratio between a protective ligand and an inorganic nanoparticle such that the critical amount is obtained in the reaction system.

6. A method for producing the stabilized inorganic nanoparticle of claim 1, comprising the steps of preparing the inorganic nanoparticle: initiating a reaction of bonding the protective ligand to the inorganic nanoparticle while maintaining the inorganic nanoparticle stably; and stopping the reaction forcibly at
(7) a time when it is judged, based on experimentally obtained standard data, that the amount of the protective ligand bonded to the inorganic nanoparticle is the critical amount of (1) or (2) recited in claim 1 or that the form of modifying the surface of the inorganic nanoparticle by the protective ligand is the critical modification form of (3) recited in claim 1.

7. The method according to claim 6, wherein, in the case of using a metal nanoparticle as the inorganic nanoparticle, the method comprises the steps of preparing an aqueous solution of a metal salt used as a material for the metal nanoparticle; bringing the aqueous solution into contact with a toluene phase containing the protective ligand and a phase transfer agent; and reducing the toluene phase to initiate a reaction of generating the metal nanoparticle and a reaction or bonding the protective ligand to the metal nanoparticle.

8. The method according to claim 6, wherein the average particle diameter of the stabilized inorganic nanoparticle obtained in the method is controlled by changing a reaction agent concentration, a reaction temperature, or a reaction time in the reaction system.

9. The method according to claim 6, wherein the reaction of bonding the protective ligand to the inorganic nanoparticle is forcibly stopped by
(8) inactivation of an agent controlling the reaction of generating the metal nanoparticle including at least an agent for the reduction, and/or
(9) dilution of a reaction solution.

10. A method for using the stabilized inorganic nanoparticle of claim 1, comprising bonding a functional ligand to the stabilized inorganic nanoparticle of claim 1, to obtain a functional inorganic nanoparticle with an additional characteristic or function.

11. The method according to claim 10, wherein the functional inorganic nanoparticle is such that (A) the functional ligand is bonded to a free site of the stabilized inorganic nanoparticle or (B) the functional ligand is bonded to a free site of the stabilized inorganic nanoparticle and a protective ligand is replaced by another functional ligand.

12. The method according to claim 10, wherein the functional ligand is selected from the group consisting of

(10) ligands capable of specifically bonding to a bioactive molecule including at least a DNA and a protein,

(11) luminescent ligands including at least fluorescent ligands and phosphorescent ligand,

(12) ligands capable of specifically bonding to a particular ion or chemical species,

(13) ligands having an electrically conductive or superconductive property,

(14) ligands having an electroluminescent property,

(15) ligands having a nonlinear optical property, and

(16) ligands having a laser emission property.

* * * * *